Feb. 8, 1955 J. S. RUX 2,701,583
SHOCK ABSORBER
Filed May 15, 1953

INVENTOR

JOHN S. RUX

United States Patent Office 2,701,583
Patented Feb. 8, 1955

2,701,583

SHOCK ABSORBER

John S. Rux, Michigan City, Ind.

Application May 15, 1953, Serial No. 355,379

1 Claim. (Cl. 138—26)

This invention relates to a shock absorber for hydraulic systems.

It is an object of the present invention to provide a shock absorber adapted for use with hydraulic systems for alleviating water or fluid hammer in the system resulting from the sudden stopping of the flow of movement of fluid in the system and thereby to prevent the loosening of pipe threads, valve parts, the work hardening of the pipe and break by fatigue.

It is another object of the invention to provide a shock absorber for hydraulic use which is of simple construction, easy to install, requires a minimum of maintenance, inexpensive to manufacture, has a minimum number of parts, and is efficient in operation.

It is another object of the invention to provide a simple shock absorber for hydraulic use that is formed of a series of compressible rubber members disposed in a casing, and the casing connected to the hydraulic system so that upon a pressure being built up in the system the rubber members will be compressed and the entrapped air compressed to cushion the shock wave and wherein the wear upon the shock absorber is kept to a minimum.

For a better understanding of the invention, reference may be had to the following detailed description taken in connection with the accompanying drawing, in which.

Figure 1:
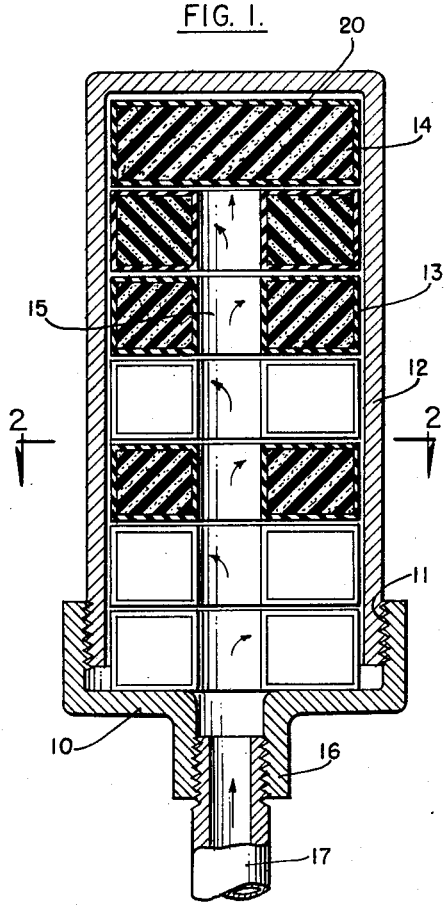
Figure 1 is a vertical sectional view of the shock absorber embodying the features of the present invention.
Figure 2:
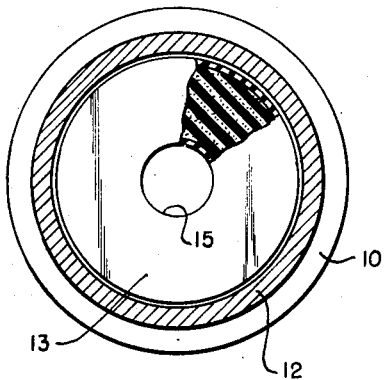
Fig. 2 is a transverse sectional view taken on line 2—2 of Fig. 1.

Referring now to the figures, 10 represents a threaded cap having internal threads 11 for engagement with a cylindrical container 12 that houses a plurality of compressible rubber disc elements 13 and 14. The cylinder 12 is closed at its upper end and against the upper end rests a full disc 14. The other discs 13 have central openings, as indicated at 15 to permit the fluid to be extended a full extent into the cylinder 12.

The cap has a reduced internally threaded sleeve portion 16 to which a pipe 17 is screw fitted. Through the pipe 17 the fluid of the hydraulic system will be passed into the cylinder 12. This fluid will move upwardly through the openings 15 in the elements 13 and will finally come to rest against the upper disc 14.

Figure 3:
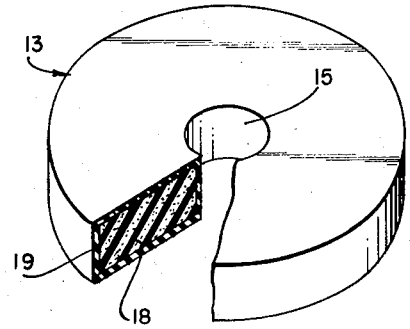
Fig. 3 is a perspective view of one of the rubber compressible discs.

The discs 13 are formed of sponge rubber rings 18, as shown in Fig. 3, which are covered with a covering 19 that is impervious to liquid. The coating or covering 19 is preferably made of synthetic rubber or neoprene and will be compressed laterally by the fluid entering the cylinder 12. The disc 14 is similarly compressed and is formed in a similar manner with a sponge rubber core and a rubber covering 20.

The shock wave or energy is dissipated when the rubber discs in the casing or cylinder are compressed. Each rubber disc acts as a separate functioning unit permitting a few units to fail without totally destroying the effectiveness of the absorber. The outer rubber coating or jacket keeps the inner sponge rubber resilient and impervious to liquids and prevents the loss of effectiveness caused by water logging. Under pressure, the sponge rubber compresses because of its cellular structure and also partially compresses the entrapped air in each rubber disc unit. Thus, both the resiliency of the sponge rubber and the entrapped air act as an absorbing agent. Under normal pressure conditions, the rubber discs will return then to their normal shape after each and every shock wave. The size of the shock absorber will be dependent upon the pressure, temperature and upon the nature of the liquid in the system. The rubber discs may be die cut or molded of sponge rubber and then dipped by coating to provide the desired covering so as to render the elements impervious to the liquids. It will be seen that the shock usually created by the sudden stopping of the flow of fluid in a system will be alleviated and dissipated so that the various parts of the system will be kept in good condition.

While various changes may be made in the detail construction, it shall be understood that such changes shall be within the spirit and scope of the present invention, as defined by the appended claim.

What is claimed is:

A shock absorber for hydraulic systems comprising a cylindrical housing closed at one end and open at the other, said housing at the open end thereof being externally threaded, an internally threaded cap adapted to be screwed onto said open end of said casing, said cap being formed with a central, relatively narrow neck, said neck being internally threaded and adapted to be screwed onto an externally threaded pipe of the hydraulic system, a substantially cylindrical compressible element fitting snugly within said casing and being disposed adjacent the inner face of the closed end thereof, said element comprising a sponge rubber core and a coating on the exterior of the sponge rubber core adapted to render the same impervious to liquid, and a plurality of second, substantially cylindrical compressible elements fitting snugly within said casing and filling the interior therewithin intermediate said first compressible element and said cap, each of said second compressible elements having a central opening aligned with said neck and being formed of a sponge rubber core having a coating on the exterior thereof adapted to render the same impervious to liquid.

References Cited in the file of this patent

UNITED STATES PATENTS

| 2,495,693 | Byrd et al. | Jan. 31, 1950 |
| 2,629,402 | Cook | Feb. 24, 1953 |

FOREIGN PATENTS

| 618 | Great Britain | of 1888 |
| 17,403 | Great Britain | Aug. 6, 1896 |
| 104,257 | Australia | June 30, 1938 |